Feb. 21, 1967   L. V. YORK, JR   3,305,648
TIMING DEVICE
Filed May 6, 1965   2 Sheets-Sheet 1

INVENTOR.
LYNN V. YORK, JR.
BY David M. Schiller
ATTORNEY

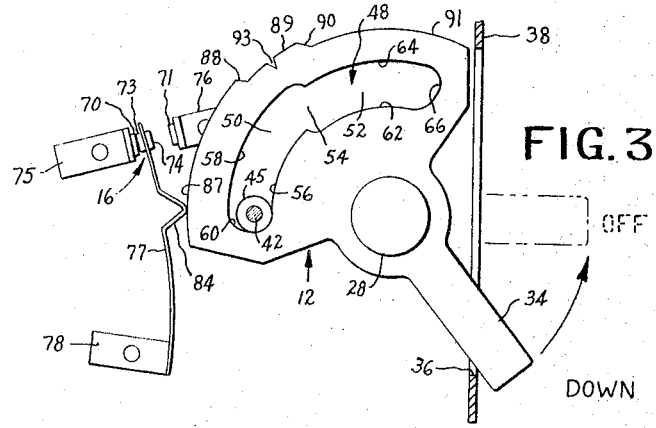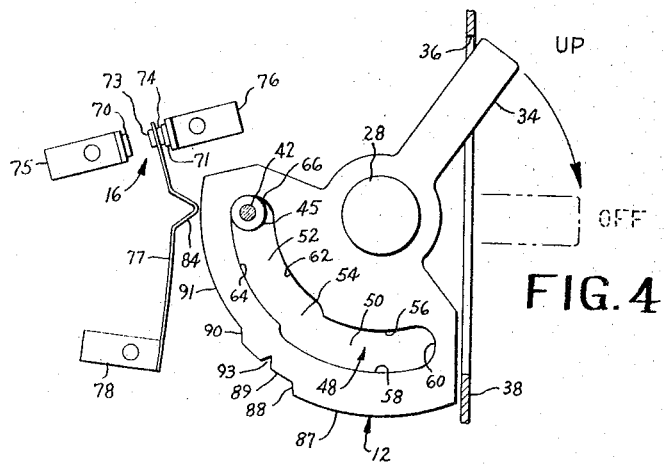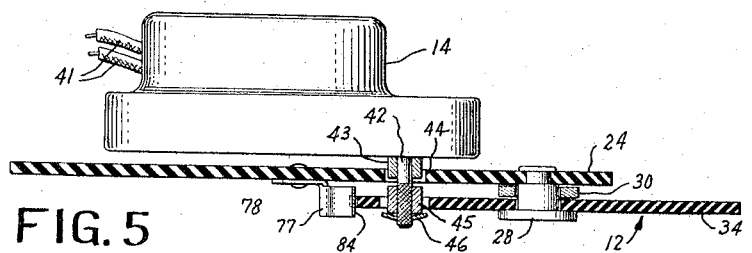

United States Patent Office 3,305,648
Patented Feb. 21, 1967

3,305,648
TIMING DEVICE
Lynn V. York, Jr., Bloomington, Ill., assignor to General
Electric Company, a corporation of New York
Filed May 6, 1965, Ser. No. 453,740
7 Claims. (Cl. 200—35)

This invention relates to timing devices and particularly to manually operated motor driven timers.

Manually operated motor driven timers of previous designs have generally included a large number of expensive parts such as precision gears and cams, contributing to a complex and costly design of bulky construction. These disadvantages are particularly apparent in timers of the so-called two-way type wherein the timer can be manually actuated in two different directions for effecting two different timed controlling functions. In previous two-way timer designs costly reversible motors have been employed and in some cases two separate motors have been utilized to provide for the two-way operation. The present invention overcomes these and other disadvantages of prior manually operated motor driven timers.

It is therefore a primary object of the invention to provide a novel and improved timer which incorporates a minimum number of inexpensive parts and which is of compact construction.

It is another object of the invention to provide a novel and improved manually operated two-way motor driven timer including a unidirectional motor drive for effecting the timing operation.

It is a further object of the invention to provide a novel and improved manually operated two-way motor driven timer which is of inexpensive and reliable construction and which employs a unidirectional motor drive acting on a single manually operatable cam member.

In carrying out the invention in one form, a two-way timer includes a unidirectional motor having a shaft and a manually operated member mounted for movement relative to the motor in directions perpendicular to the shaft between a neutral position and second and third positions spaced angularly from the neutral position on opposite sides thereof. The member includes a pair of walls which are parallel to the motor shaft and which are configured so that the motor shaft is spaced therefrom when the member is in its neutral position, and the motor shaft and one of the walls are brought into frictional engagement in response to movement of the member to any position between its neutral position and its second and third positions. The motor is effective when the member is moved in either direction from its neutral position to rotate the shaft in a direction for moving the member back to its neutral position to effect a timing operation. Suitable switch means are operated in response to movement of the member to provide desired controlling functions.

Other objects and advantages of the invention will become apparent from the following description taken in conjunction with the accompanying drawings in which:

FIGURE 3 is a view in side elevation showing the cam pivoted from its neutral position shown in FIG. 2 to a second position;

FIGURE 4 is a view similar to FIG. 3 showing the cam pivoted from its neutral position shown in FIG. 2 to a third position; and FIGURE 5 is a view in section taken along the line 5—5 of FIG. 2.

Figure 1:
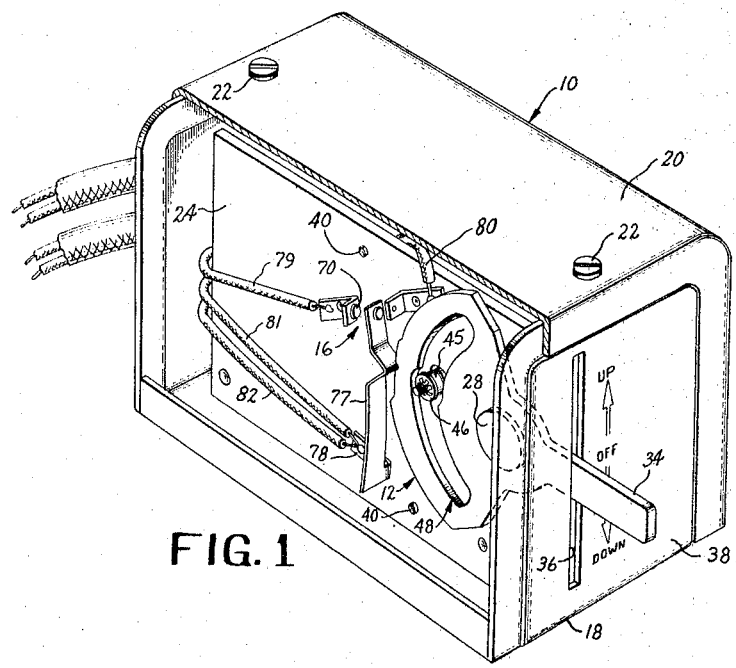
FIGURE 1 is a view in perspective showing the timer of the present invention.
Figure 2:
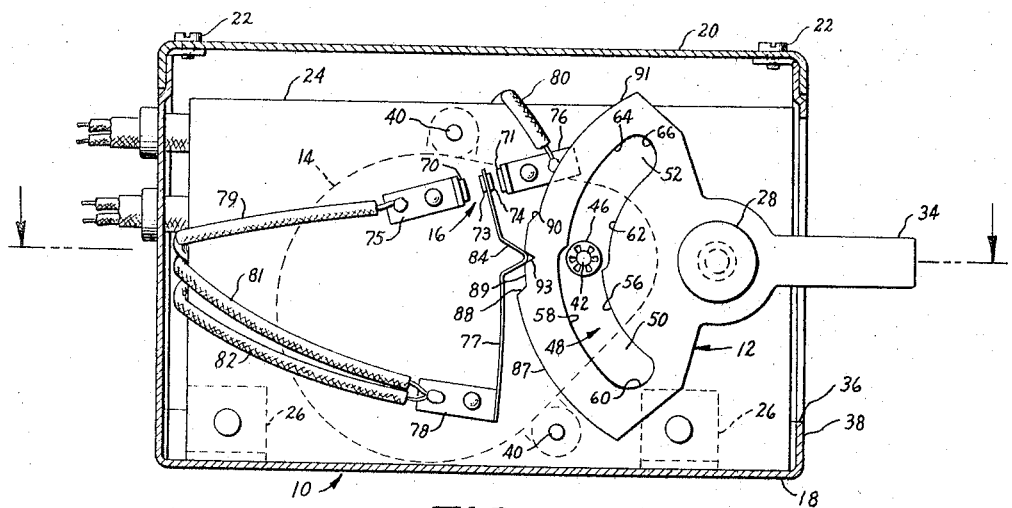
FIGURE 2 is a view in side elevation of the timer of FIG. 1 with parts shown in section and with the cam illustrated in its neutral position.

Referring now to the drawing there is illustrated in FIG. 1 a timer constructed in accord with the present invention including a housing 10 which contains all the basic parts of the timer. These basic parts include a cam member 12 adapted for manual operation to initiate a timing operation, a motor 14 arranged to drive the cam 12 to effect a timing operation, and a switch 16 responsive to movements of the cam 12. As shown in FIGS. 1 and 2 the housing 10 includes a base 18 and a cover 20 detachably connected to the base as by screws 22. Within the housing is a rectangular mounting plate 24 secured in any suitable manner to the bottom wall of the base 18 such as by riveting to brackets 26 mounted on the bottom wall. The plate 24 extends upwardly from the bottom wall adjacent to a side of the housing and all of the parts of the timer are conveniently mounted by the plate 24.

In accord with the invention the cam 12 is mounted for movement from a neutral position to initiate a timing operation and the motor is drivingly connected to the cam in response to movement thereof to drive the cam back to its neutral position to perform a timing operation. The invention contemplates a one-way timer wherein the cam is movable in one direction from its neutral position and also a two-way timer wherein the cam is movable in two opposite directions from its neutral position. A two-way timer is illustrated and the cam 12 is preferably mounted for pivotal movement. In the illustrated embodiment the cam is mounted on the plate 24 at one side thereof for pivotal movement by a rivet 28 which extends through aligned openings of the cam 12 and plate 24 and also through an opening in a spacer 30 located between the cam 12 and plate 24. With the arrangement described the cam 12 is parallel to and spaced from the plate 24 as best shown in FIG. 5. Also, the cam occupies a neutral position shown in FIG. 2 when the timer is inoperative. In order to effect movement of the cam 12 from its neutral position to initiate a timing operation a lever 34 is conected to the cam to extend outwardly of the housing through a vertical slot 36 formed in an end wall 38 of the housing. In the embodiment illustrated, when the cam 12 is in its neutral position as shown in FIGS. 1 and 2, the lever 34 is approximately midway between the end walls of the slot 36 and may conveniently be actuated manually either downwardly to a second pivoted position shown in FIG. 3, or upwardly to a third position shown in FIG. 4.

In accord with the invention unidirectional rotation of the motor 14 is effective to drive the cam 12 from either of its pivoted positions back to its neutral position to perform a timing operation. The motor 14 is conveniently mounted on the plate 24 by suitable fasteners 40 at the side of the plate 24 opposite the side thereof containing the cam 12. An electric motor is preferred and it is energized by connecting its conductors 41 to a suitable source of voltage (not shown). The motor includes a rotatable shaft 42 which extends through a bearing 43 and through an opening 44 of the plate 24. The shaft 42 is generally parallel to and spaced from the axis of pivotal movement of the cam 12 and includes a knurled portion which tightly receives a collar 45 formed of a suitable plastic such as polyvinyl chloride plastic. A spring grip fastener 46 is positioned on the shaft 42 between the collar 45 and the end of the shaft. The periphery of the collar 45 is dimensioned to frictionally engage a wall of the cam 12 in response to movement of the cam 12 away from its neutral position. For this purpose the cam contains a slot 48 which is arcuate about the axis of pivotal movement of the cam and into which the collar 45 projects. The slot 48 is configured to form two slot portions 50 and 52 which, in the illustrated embodiment, have substantially equal lengths and which are connected in communication with each other by a central slot portion 54. In certain applications, the lengths of the slot portions 50 and 52 may be made unequal. The slot portion 50 includes a pair of radially spaced curved inner and outer side walls 56 and 58 respectively, and an end wall 60. In like manner, the slot portion 52 includes a pair of radially spaced curved inner and outer side walls 62 and 64 respectively, and an end wall 66. Each of the side walls is parallel to the shaft 42 and the side walls 56 and 58 are spaced radially of the axis of pivotal movement of the cam by distances which are greater than the distances by which the side walls 62 and 64 are so spaced. The side walls 56 and 64 lie in curved planes which are spaced in a direction perpendicular to the shaft 42.

When the cam is in its neutral position, the collar 45 is in the central slot portion and is spaced from the side walls of the slot 48, and when the cam is pivoted in either direction from its neutral position, one or the other of the side walls 56 and 64 is moved into frictional engagement with the periphery of the collar 45. The motor 14 is preferably energized continuously while the apparatus controlled by the timer is energized. Let it be assumed that the motor is rotating the shaft 42 and collar 45 in a clockwise direction as viewed in FIG. 2. If the lever 34 is actuated downwardly, the cam 12 is pivoted to its position illustrated in FIG. 3 wherein the end wall 60 of the slot 48 engages the collar 45. The periphery of the collar 45 is now in frictional engagement with the side wall 56 and rotation of the collar in the clockwise direction results in downward movement of the side wall 56 as viewed in FIG. 3 and consequent pivotal movement of the cam back towards its neutral position. In a similar manner, raising of the lever 34 results in pivoting of the cam from its neutral position to its position shown in FIG. 4 wherein the end wall 66 engages the collar. Clockwise rotation of the collar with its periphery in frictional engagement with the side wall 64 results in raising of the side wall 64 as viewed in FIG. 4 and consequent pivoting of the cam back towards its neutral position. In the embodiment illustrated, the angles through which the cam pivots from its neutral position to its extreme second and third positions are substantially equal.

In order to provide controlling functions in response to movements of the cam 12 the switch 16 is disposed for operation by a cam surface on the cam 12. In the illustrated embodiment, the switch 16 is in the form of a single pole double throw switch with two spaced fixed contacts 70 and 71 selectively engageable with movable contacts 73 and 74 are located between the fixed contacts. The fixed contacts 70 and 71 are respectively mounted on L-shaped conductive supports 75 and 76 mounted on the plate 24. The movable contacts 73 and 74 are carried at the end of and on opposite sides of an elongated spring 77 connected in any suitable manner to a conductive support 78 secured to the plate 24. Conductors 79 and 80 are connected respectively to the supports 75 and 76 and conductors 81 and 82 are connected to the support 78 and lead to suitable controlled apparatus. The spring 77 includes a projection 84 in engagement with an outer curved cam surface on the cam 12 characterized by an outermost surface 87, an adjacent shoulder 88, an adjacent middle surface 89, an adjacent shoulder 90, and an innermost surface 91. The cam 12 is releasably retained in its neutral position by means of the projection 84 engaging a notch 93 formed in the middle surface 89. The spring 77 is biased towards the cam and is positioned by the cam when such is in its neutral position so that the movable contacts are spaced from their associated fixed contacts.

Operation of the timer will now be described. Let it be assumed that the timer is associated with a hospital bed control including a control motor which is connected to the conductors 79, 80, 81 and 82 so that when the contacts 70 and 73 are engaged, the control motor is energized to rotate in a direction for lowering the bed, and when the contacts 71 and 74 are engaged, the control motor is energized to rotate in the opposite direction to elevate the bed. If it is desired to lower the bed, an operator or the patient merely depresses the lever 34 which pivots the cam 12 in a clockwise direction as viewed in FIG. 2 from its neutral position to the position shown in FIG. 3. During such movement of the cam the spring 77 is displaced by the cam surface 87 towards the left as viewed in FIG. 2 sufficiently to effect engagement of the contacts 70 and 73 as shown in FIG. 3. Therefore, the lowering movement of the bed is initiated prior to complete depression of the lever 34, and when the lever is completely depressed, it is released to initiate the timing period which determines the duration of the lowering movement of the bed. The timing period is determined substantially by the length of time required for the cam 12 to return from the position shown in FIG. 3 to its neutral position shown in FIG. 2. As previously explained, the return to neutral of the cam 12 results from the rotation of the periphery of the collar 45 against the side wall 56. When the cam surface 87 moves beyond the projection 84 during return movement of the cam, the projection 84 and the spring 77 are displaced to the right onto the surface 89 to effect disengagement of contacts 73 and 74 and termination of the lowering of the bed. When the side wall 56 is disengaged from the collar 45, the projection 84 enters the notch 93 to retain the cam in its neutral position.

If it is desired to elevate the bed, the operator merely raises the lever 34 to effect pivotal movement of the cam from its neutral position to the position shown in FIG. 4. Such movement results in displacement of the spring 77 towards the right as viewed in FIG. 2 by action of the spring bias force to effect engagement of the contacts 71 and 74 as shown in FIG. 4. The projection 84 does not engage the surface 91 but is slightly spaced therefrom. This initiates elevation of the bed and when the lever 34 is released, such elevation will continue during the timing period while the cam 12 is being pivoted from its position in FIG. 4 back to its neutral position by rotation of the periphery of the collar 45 against the side wall 64. When the cam surface 91 passes beyond the projection 84 during return movement of the cam, the spring 77 is displaced towards the left as viewed in FIG. 4 by engagement of the projection 84 with the shoulder 90 and the cam surface 89 to disengage the contacts 71 and 74. This terminates the elevating movement of the bed. When the side wall 64 is disengaged from the collar 45, the projection 84 enters the notch 93 to retain the cam in its neutral position.

It can be demonstrated that the timing period of the timer is directly proportional to the angle through which the cam 12 is pivoted from its neutral position and also to the effective cam radius which is the distance from the axis of pivotal movement of the cam to the selected one of the side walls 56 and 64. The timing period is inversely proportional to the rotational speed of the motor 14 and also to the diameter of the collar 45. The timer of the present invention has a wide variety of applications and is advantageously employed in association with apparatus which is lowered and elevated by motor operated mechanism wherein a certain lowering movement is ordinarily accomplished in a shorter time than the time required for the same elevating movement. With the improved timer illustrated wherein the oppositely directed cam displacement angles are equal, the lowering and elevating movements of the controlled apparatus are automatically substantially equalized inasmuch as the full timing period for the lowering movement is inherently less than the full timing period for the elevating movement. This is for the reason that the effective cam radius for the lowering movement is the distance between the axis of the cam 12 and the side wall 56, and this distance is less than the effective cam radius for the elevating movement which is the distance between the cam axis and the side wall 64. Of course, provision could be made to permit adjustment of the oppositely directed cam displacement angles to thereby permit variation of the two timing periods.

Although the motor 14 is described as being continuously energized, the invention is not limited to this arrangement and the motor 14 can be in a deenergized condition when the cam is in its neutral position, and can be energized in response to pivotal movement of the cam from its neutral position.

Although the invention has been described with reference to certain specific embodiments thereof, numerous modifications are possible and it is desired to cover all modifications falling within the spirit and scope of the present invention.

What I claim as new and desire to secure by Letters Patent of the United States is:

1. A timing device comprising in combination, a unidirectional driving motor having a rotatable shaft, a member mounted for movement relative to the shaft in directions transverse to the shaft between a neutral position and a second position spaced from the neutral position, means for moving said member from its neutral position to its second position to initiate a timing period, said member having a wall which is uninterrupted throughout its extent and which is generally parallel to said shaft, said shaft having a periphery which is uninterrupted throughout its extent and which is spaced from said wall when the member is in its neutral position, said member when moved from said neutral position toward said second position moving said wall into frictional engagement with the shaft periphery for any position of said member between said neutral and second positions, said motor being effective when said member is moved from its neutral position to rotate said shaft and its periphery against said wall in a direction to move said member back to its neutral position, and switch means responsive to movement of said member, said motor shaft being rotatable in a single direction and constituting the sole means for driving said member back to its neutral position.

2. A timing device comprising in combination, unidirectional driving motor having a rotatable shaft, a member mounted for movement relative to the shaft in directions transverse to the shaft between a neutral position and a second position spaced from the neutral position, means for moving said member from its neutral position to its second position to initiate a timing period, said member having a wall which is uninterrupted throughout its extent and which is generally parallel to said shaft, said shaft having a periphery which is uninterrupted throughout its extent and which is spaced from said wall when the member is in its neutral position, said member when moved from said neutral position toward said second position moving said wall into frictional engagement with the shaft periphery for any position of said member between said neutral and second positions, said motor being effective when said member is moved from its neutral position to rotate said shaft and its periphery against said wall in a direction to move said member back to its neutral position, means releasably retaining said member in its neutral position, fixed contact means, and movable contact means movable into and out of engagement with said fixed contact means in response to movement of said member, said motor shaft being rotatable in a single direction and constituting the sole means for driving said member back to its neutral position.

3. A timing device comprising in combination, a unidirectional driving motor having a rotatable shaft, a member mounted for pivotal movement relative to the shaft about an axis parallel to and spaced from the shaft between a neutral position and a second position angularly spaced from the neutral position, means for pivoting said member from its neutral position to its second position to initiate a timing period, said member having a wall which is uninterrupted throughout its extent and which is generally parallel to said shaft and curved about said axis in radially spaced relation with said axis, said shaft having a periphery which is uninterrupted throughout its extent and which is spaced from said wall when the member is in its neutral position, said member when pivoted from said neutral position toward said second position moving said wall into frictional engagement with the shaft periphery for any position of said member between said neutral and second positions, said motor being effective when said member is pivoted from its neutral position to rotate said shaft and its periphery against said wall in a direction to pivot said member back to its neutral position, a cam surface on said member, a conductive leaf spring engaging said cam surface to releasably retain said member in its neutral position, and a fixed contact, said leaf spring being movable into and out of engagement with said fixed contact in response to pivotal movement of said member, said motor shaft being rotatable in a single direction and constituting the sole means for driving said member back to its neutral position.

4. A timing device comprising in combination, a housing, a support plate in said housing, a unidirectional driving motor mounted on said plate at one side thereof, said motor having a shaft extending through said plate to the other side thereof, said shaft having a periphery which is uninterrupted throughout its extent, a member mounted on said plate at said other side thereof for pivotal movement relative to the shaft about an axis parallel to and spaced from the shaft between a neutral position and a second position angularly spaced from the neutral position, means extending outside said housing for pivoting said member from its neutral position to its second position to initiate a timing period, said member having a slot curved about said axis and spaced radially of said axis, said shaft projecting into said slot, said slot having radially spaced side walls both of which are uninterrupted throughout their extent and both of which are spaced from the periphery of the shaft when the member is in said neutral position, said member when pivoted from said neutral position toward said second position moving one of said walls into frictional engagement with the periphery of the shaft for any position of said member between said neutral and second position, said motor being effective when said member is pivoted from its neutral position to rotate said shaft and its periphery against said one side wall in a direction to pivot said member back to its neutral position, and switch means mounted on said plate at said other side thereof responsive to pivotal movement of said member, said motor shaft being rotatable in a single direction and constituting the sole means for driving said member back to its neutral position.

5. A timing device comprising in combination, a motor having a shaft rotatable in a single direction, a member mounted for movement relative to said shaft in directions transverse to said shaft between a neutral position and second and third positions spaced from and on opposite sides of said neutral position, means for selectively moving said member in opposite directions from said neutral position to said second and third positions, said member having a pair of walls lying in planes which are spaced in a direction perpendicular to the shaft, said shaft extending between said planes and having a periphery spaced from said walls when said member is in said neutral position, said member when moved from said neutral position towards said second position moving one of said walls into frictional engagement with the periphery of said shaft for any position of said member between said neutral position and said second position, said member when moved from said neutral position towards said third position moving the other of said walls into frictional engagement with the periphery of said shaft for any position of said member between said neutral position and said third position, said motor being effective when said member is selectively moved to either of said second and third positions to rotate said shaft periphery against the selected wall in said single direction to return said member to said neutral position, and switch means responsive to movement of said member.

6. A timing device comprising in combination, a motor having a rotatable shaft, a member mounted for pivotal movement relative to the shaft about an axis parallel to and spaced from the shaft in opposite directions from a neutral position to second and third positions spaced angularly from the neutral position, means for selectively pivoting said member from said neutral position to said second and third positions, said member having a pair of slots arcuate about said axis and each including a pair of radially spaced inner and outer side walls, said slots being connected in communication with each other through a central slot portion with the side walls of one slot spaced radially of said axis by distances which are greater than the distances by which the corresponding side walls of the other slot are so spaced, said shaft projecting into said slots for any position of pivotal movement of said member, said shaft having a periphery which is spaced from said side walls when the member is in said neutral position, said member when pivoted from said neutral position towards said second position moving the inner side wall of said one slot into frictional engagement with the shaft periphery for any position of said member between said neutral position and said second position, said member when pivoted from said neutral position towards said third position moving the outer side wall of said other slot into frictional engagement with the shaft periphery for any position of said member between said neutral position and said third position, means for energizing said motor to rotate said shaft continuously in a single direction which is effective when said member is pivoted to either of said second and third positions to cause said shaft periphery to frictionally engage the selected side wall and pivot said member back to said neutral position, means releasably retaining said member in said neutral position, and switch means responsive to movement of said member.

7. A timing device comprising in combination, a motor having a rotatable shaft, a member mounted for pivotal movement relative to the shaft about an axis parallel to and spaced from the shaft in opposite directions from a neutral position to second and third positions spaced angularly from the neutral position, means for selectively pivoting said member from said neutral position to said second and third positions, said member having a pair of slots arcuate about said axis and each including a pair of radially spaced inner and outer side walls, said slots being connected in communication with each other through a central slot portion with the side walls of one slot spaced radially of said axis by distances which are greater than the distances by which the corresponding side walls of the other slot are so spaced, said shaft projecting into said slots for any position of pivotal movement of said member, said shaft having a periphery which is spaced from said side walls when the member is in said neutral position, said member when pivoted from said neutral position towards said second position moving the inner side wall of said one slot into frictional engagement with the shaft periphery for any position of said member between said neutral position and said second position, said member when pivoted from said neutral position towards said third position moving the outer side wall of said other slot into frictional engagement with the shaft periphery for any position of said member between said neutral position and said third position, means for energizing said motor to rotate said shaft continuously in a single direction which is effective when said member is pivoted to either of said second and third positions to cause said shaft periphery to frictionally engage the selected side wall and pivot said member back to said neutral position, a pair of fixed spaced contacts, movable contact means between said fixed contacts, and a leaf spring supporting said movable contact means, said member including a cam surface in engagement with said leaf spring, said cam surface being configured to position said leaf spring so that said movable contact means is spaced from both of said fixed contacts when said member is in said neutral position, to deflect said leaf spring so that said movable contact means is moved into engagement with one of said fixed contacts when said member is pivoted from said neutral position to said second position, and to deflect said leaf spring so that said movable contact means is moved into engagement with the other of said fixed contacts when said member is pivoted from said neutral position to said third position.

References Cited by the Examiner

UNITED STATES PATENTS 2,645,032   7/1953   Hammell _____ 200—35
2,693,231  11/1954  Morganson _____ 200—35

BERNARD A. GILHEANY, *Primary Examiner.*

G. MAIER, *Assistant Examiner.*